United States Patent
Bruck et al.

(10) Patent No.: US 10,046,416 B2
(45) Date of Patent: Aug. 14, 2018

(54) METHOD OF WELD CLADDING OVER OPENINGS

(71) Applicant: Siemens Energy, Inc., Orlando, FL (US)

(72) Inventors: Gerald J. Bruck, Titusville, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 357 days.

(21) Appl. No.: 14/883,688

(22) Filed: Oct. 15, 2015

(65) Prior Publication Data

US 2017/0106474 A1   Apr. 20, 2017

(51) Int. Cl.
| | |
|---|---|
| *B23K 26/34* | (2014.01) |
| *B23K 26/342* | (2014.01) |
| *B33Y 10/00* | (2015.01) |
| *B23K 26/32* | (2014.01) |
| *C22C 19/05* | (2006.01) |
| *B23K 26/082* | (2014.01) |
| *B22F 5/04* | (2006.01) |
| *B22F 7/08* | (2006.01) |
| *B33Y 80/00* | (2015.01) |
| *B23K 101/00* | (2006.01) |
| *B22F 3/105* | (2006.01) |

(52) U.S. Cl.
CPC ......... *B23K 26/342* (2015.10); *B22F 3/1055* (2013.01); *B22F 5/04* (2013.01); *B22F 7/08* (2013.01); *B23K 26/082* (2015.10); *B23K 26/32* (2013.01); *B33Y 10/00* (2014.12); *C22C 19/055* (2013.01); *B22F 2003/1058* (2013.01); *B23K 2201/001* (2013.01); *B33Y 80/00* (2014.12)

(58) Field of Classification Search
CPC .... B23K 26/342; B23K 26/082; B23K 26/32; B23K 2201/001; B33Y 10/00; B33Y 80/00
USPC .............................................. 219/73.21, 76.1
See application file for complete search history.

(56) References Cited

U.S. PATENT DOCUMENTS

| | | | |
|---|---|---|---|
| 6,214,248 B1 * | 4/2001 | Browning | B23P 15/04 216/17 |
| 2011/0106290 A1 | 5/2011 | Hovel et al. | |
| 2012/0181255 A1 * | 7/2012 | Bruck | B23K 9/324 219/73.2 |
| 2013/0056449 A1 | 3/2013 | Lin et al. | |
| 2013/0101761 A1 | 4/2013 | Bunker et al. | |
| 2014/0042211 A1 | 2/2014 | Becker et al. | |
| 2015/0033559 A1 | 2/2015 | Bruck et al. | |
| 2015/0034266 A1 | 2/2015 | Bruck et al. | |
| 2015/0037498 A1 | 2/2015 | Bruck et al. | |
| 2015/0041522 A1 | 2/2015 | Ogasahara | |

* cited by examiner

*Primary Examiner* — Brian Jennison

(57) ABSTRACT

A method including spanning a relatively larger opening (50) with a support structure (72) to divide the larger opening into a plurality of relatively smaller openings (78); placing superalloy powder across the smaller openings and in contact with the support structure; and melting the superalloy powder to form a cladding layer (104) that spans the opening and is metallurgically bonded to the support structure.

19 Claims, 4 Drawing Sheets

METHOD OF WELD CLADDING OVER OPENINGS

FIELD OF THE INVENTION

The invention relates generally to the field of welding, and more specifically to weld cladding over openings using an underlying support arrangement.

BACKGROUND OF THE INVENTION

Repair of thin walled structures such as gas turbine blades often requires excavation of defects extending through the structure. Openings/holes that result must be refilled with matching or near matching material to ensure structural integrity. Small openings may be "bridged" with weld metal if surface tension of molten metal to the adjoining substrate is adequate to prevent molten metal drop through due to gravity. However, this technique does not work with relatively larger openings.

Large openings may, in principle, be custom fit with solid preformed repair material which is then welded into the opening with a perimeter weld joint. This practice is tedious, expensive, and requires the manufacturing of a preform after the shape of an opening is determined, or conversely, requires the opening to be formed to accommodate a predetermined preform shape. The inherent restraint of such large preformed material may also induce cracking as the material shrinks from welding. Alternately, large openings may be gradually filled with many smaller weld passes placed around the periphery of the opening until the opening is filled with filler metal. However, this method is also tedious, expensive, and subject to slumping of the weld material as multiple layers are added.

Alternate techniques for bridging large openings by welding include using backing material such as ceramics or matching alloy plates. However, for critical designs such backing plates must be removed. For example, backing plates create stress risers that remain if the backing plate remains, and the backing plate adds mass which may be undesirable in many applications including gas turbine engine blades. Many components are configured such that the back side of the repair is not readily accessible once the cladding layer is formed, and so such backing techniques are not possible.

Another alternate bridging technique involves including partly fused weld filler within the opening and welding over the weld filler to bridge the opening. This practice is known as slugging and often results in weld joints that do not comply with design, drawing, or specification requirements. Consequently, there remains room in the art for an improvement.

BRIEF DESCRIPTION OF THE DRAWINGS

The invention is explained in the following description in view of the drawings that show.

DETAILED DESCRIPTION OF THE INVENTION

The Inventors have devised a unique and innovative method for supporting a cladding layer that spans relatively large openings through the use of a support structure and optionally a supporting powder. The method includes forming a supporting arrangement such as a metal filament or a metal grid that can, in turn, be supported by a support powder. Weld material is deposited over the supporting arrangement and processed into a cladding layer that is metallurgically bonded to the support structure. The support powder, if used, is then removed to reveal the cladding layer that incorporates the support structure.

This technique may be applied to repair parts or incorporated in an additive manufacturing process. Discussion herein focuses on repair of a gas turbine blade tip, although the concepts can be applied to any repair or additive manufacturing technique.

Figure 1:
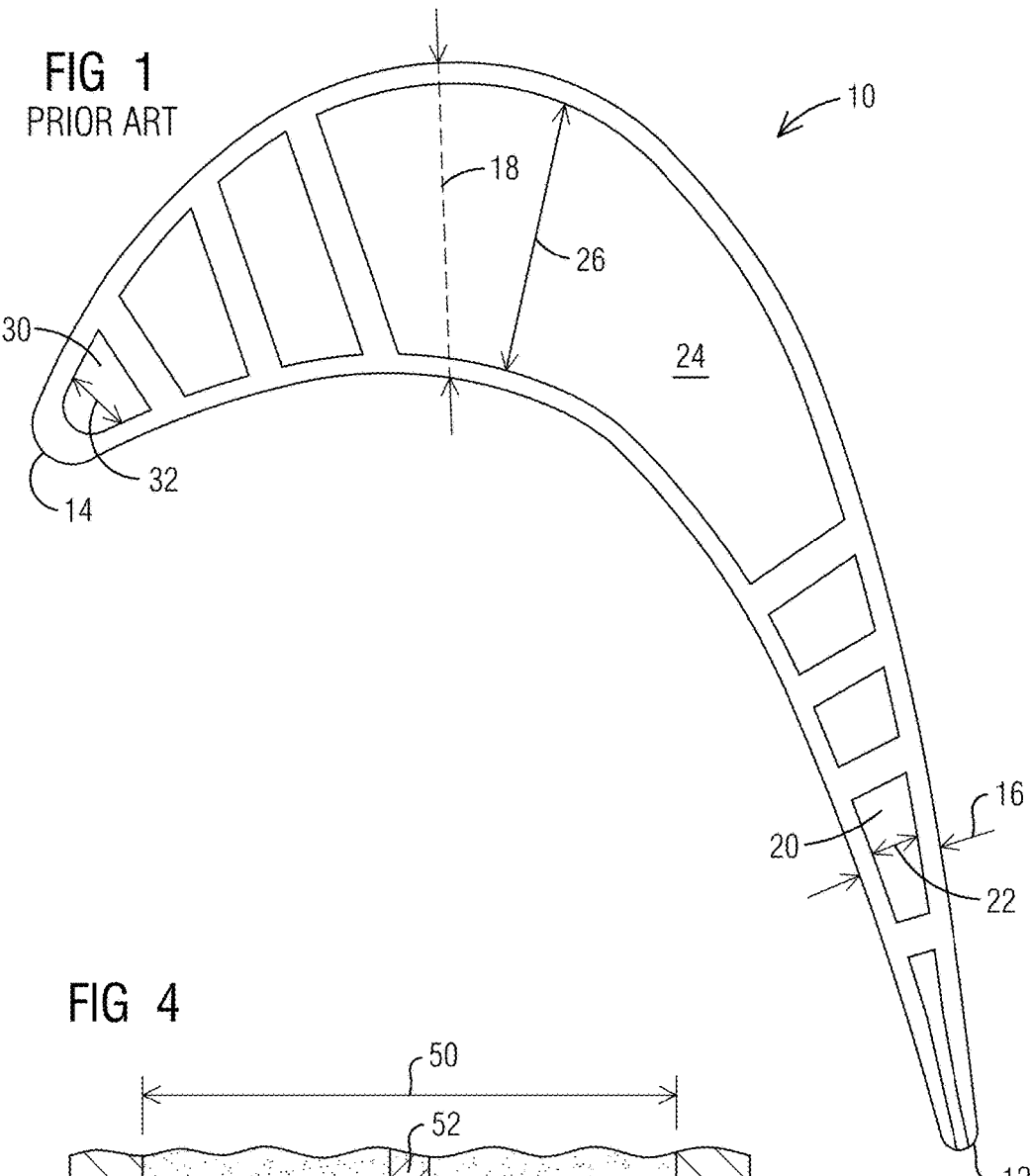
FIG. 1 is a top view of a traditional gas turbine engine blade after tip cap removal.

FIG. 1 is a top view of a typical gas turbine engine blade 10 after the blade tip has been removed as a precursor to installing a new blade tip. It can be seen that a thickness of the blade 10 varies from a trailing edge 12 to a leading edge 14, as does an associated opening width. For example, a trailing edge thickness 16 may be relatively small while a mid-span thickness 18 may be relatively large. Correspondingly, a trailing edge opening 20 has a relatively small trailing edge opening width 22 while a mid-span opening 24 has a relatively large mid-span opening width 26. Likewise, a leading edge opening 30 has a relatively small leading edge opening width 32.

Relatively small widths, e.g. up to five millimeters, can be successfully repaired using the method disclosed in U.S. Patent Application Publication Number 20150034266 to Bruck, which is incorporated by reference in its entirety herein. In that process, a supporting powder such as ceramic is placed in the opening (e.g. the trailing edge opening 20 or the leading edge opening 30), powdered metal is preplaced across the width and on the supporting powder, and powdered flux is placed on the powdered metal. A laser beam is scanned from side to side to melt and fuse the powdered metal to the underlying blade material and over the opening, thereby forming the cladding layer. The powdered metal may be a superalloy, such as a nickel based superalloy. The supporting powder may include metal or metal alloy, such as a superalloy, and may be the same composition as the powered metal.

Figure 2:
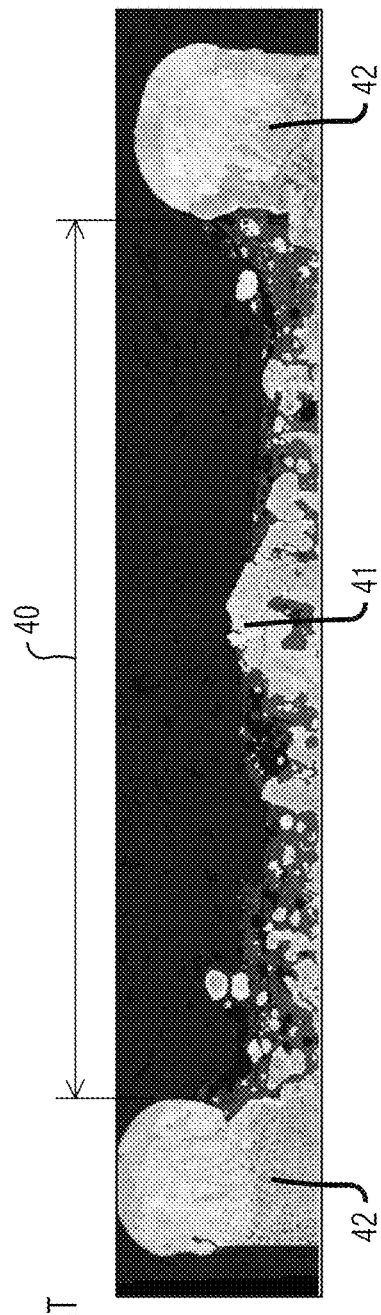
FIG. 2 is a cross section of an unsuccessful repair attempt using a first prior art repair technique.
Figure 3:
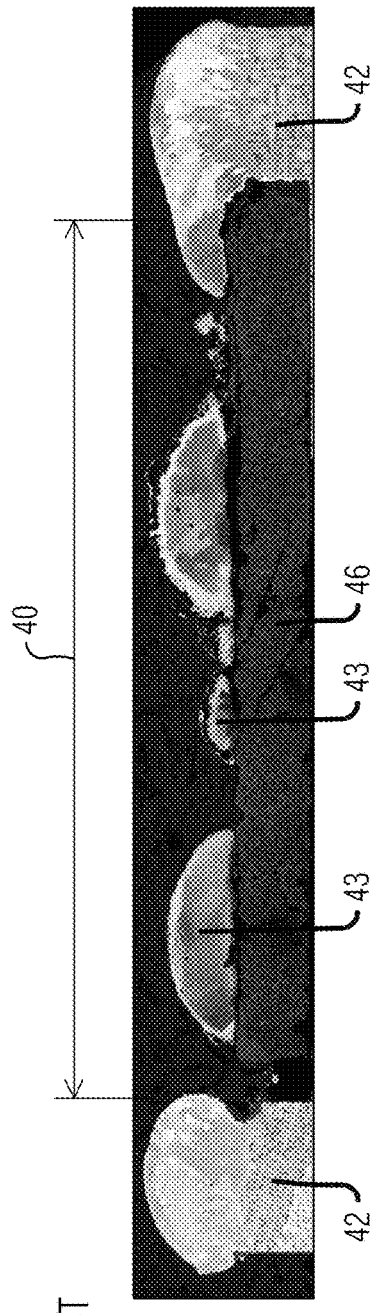
FIG. 3 is a cross section of an unsuccessful repair attempt using a second prior art repair technique.

The Inventors have recognized that this method faces limitations when applied to relatively large openings, such as those five millimeters and above. For example, FIG. 2 shows a cross section of a relatively large width 40 (e.g. similar to the mid-span opening 24) over which a clad layer was attempted using supporting powder (not visible). It can be seen that fusion is limited to the walls 42 surrounding the width 40, while the deposited metal 41 in areas over the opening has fallen into slumping supporting powder and failed to attach to the walls. FIG. 3 shows a cross section of the relatively large width 40 over which a clad layer was attempted using a solid backing support 46. While the result is improved relative to the powder support of FIG. 2, it is still not satisfactory, possibly due in part to poor wetting between the solid backing support 46 and the molten material and the resulting clumping 43 of the weld metal due to surface tension. Furthermore, in the instance of a gas turbine blade tip repair, once a cladding layer is in place, the solid backing support 46 could not be removed, rendering such an approach unacceptable for that application.

The method disclosed herein includes manipulating a relatively large opening (e.g. five millimeters and above) into a plurality of relatively smaller openings by using a supporting material which is at least partially consumed into the cladding layer. Various factors affect what opening dimension may be repaired using the prior art method disclosed in U.S. Publication Number 20150034266 to Bruck and what opening dimension is too large. For example, characteristics specific to the powdered metal, the flux, the laser parameters, the thickness, fluidity and surface tension of molten metal and slag, and the environment may contribute to the determination. Consequently, the threshold dimension where the present invention is particularly useful is the opening dimension below which powder support alone is sufficient, and above which powder support alone is insufficient. In some instances the largest dimension that can be spanned with the prior art powder support process may be up to approximately five millimeters. In other cases, the largest dimension may be up to approximately ten millimeters. Accordingly, in some applications, relatively small openings may be considered to be up to approximately five millimeters, leaving relatively large openings to be approximately five millimeters and above. In other applications, the threshold dimension may be ten millimeters. To the present inventors' knowledge, the prior art process is inadequate under all circumstances for openings of 20 millimeters and larger, whereas the present invention allows for spanning openings of 20 millimeters and larger and theoretically with unlimited width.

Figure 4:
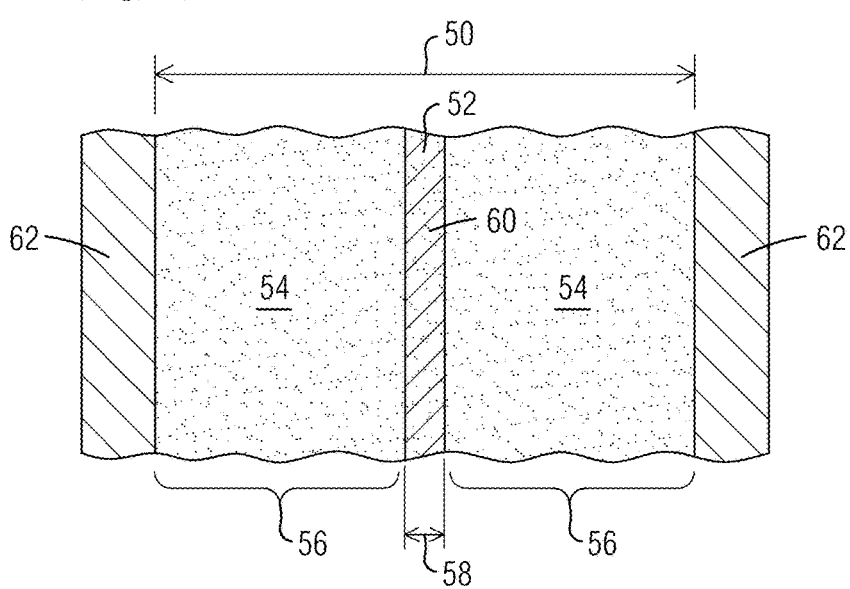
FIG. 4 illustrates a top view of an exemplary embodiment of a cladding support arrangement.

Once the relatively large opening has been manipulated into a plurality of relatively small openings, the powdered metal alloy and flux disposed thereon can be processed as though covering a plurality of relatively small opening to form a single, large cladding layer. Manipulating the relatively large opening into the plurality of relatively small openings can be achieved in a variety of ways. For example, as shown in FIG. 4, an opening 50 such as ten millimeters wide is divided with a single discrete filament 52 placed in the middle, on or nestled in the supporting powder 54, thereby dividing the single ten millimeter wide opening 50 into two openings 56 of less than five millimeters. The filament 52 may be an alloy wire, for example, or other materials as discussed more fully below. The actual width of the openings 56 would depend on the width 58 of the discrete filament 52, which may vary as desired. The powdered alloy metal and the powdered flux can be placed on an upper surface 60 of the discrete filament 52 and on the supporting powder 54 and over blade walls 62 and laser processed to form a single cladding layer that covers the ten millimeter opening 50 as well as the underlying blade material (e.g. the blade walls 62). This is possible since the laser cladding process is effective to span each of the relatively smaller openings 56 whereas spanning the relatively larger opening 50 without the intervening support filament 52 would provide unacceptable results.

Figure 5:
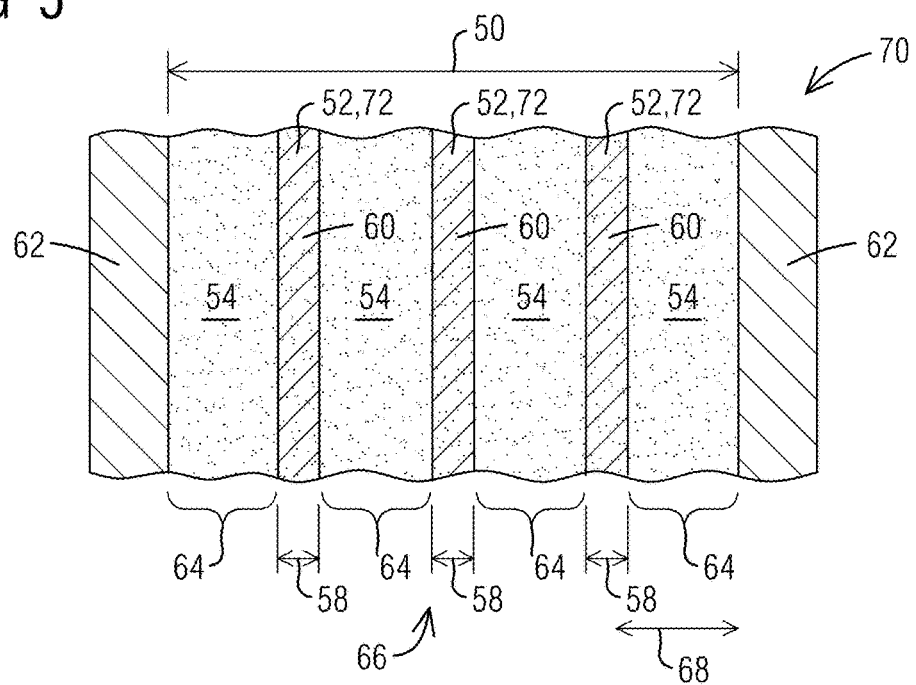
FIG. 5 illustrates a top view of an alternate exemplary embodiment of a cladding support arrangement.

Because each application has different dimensions and material/process characteristics specific to the powdered metal, the flux, the laser parameters, and the environment, etc., other embodiments of the invention may be desired. For example, as shown in FIG. 5, three discrete filaments 52 could be placed in the ten millimeter wide opening 50 to break it into four openings 64 of equal or unequal widths. Decreasing the width of each opening 64 of the plurality of openings 66 further may be beneficial if, for example, the supporting powder 54 being used slumps relatively more readily than other supporting powders, or if the melt pool for a particular material has a relatively low surface tension etc.

The discrete filaments 52 are oriented to create an opening with a dimension in at least one direction 68 that is small enough to support the weld pool in order to prevent molten metal from dropping into the opening and/or to prevent the supporting powder 54 from slumping. In an exemplary embodiment, during the laser heating process the laser beam moves back and forth along the direction 68 from one blade wall 62 to the other, and then advances in a direction perpendicular to direction 68, after which it again moves from one blade wall 62 to the other. Since the laser beam moves the melt pool across the opening 50 along the direction 68 of the width of the opening 50, and the dimension of the width has been reduced to below the threshold dimension, the melt pool will not slump or fall through. The result is a weld bead that spans the opening 50 and which is supported by the discrete filaments 52. Since the weld pool in this exemplary embodiment does not travel along a line perpendicular to direction 68, and since filament/structural support is needed primarily in the direction of travel of the melt pool, the dimension of the opening 50 perpendicular to direction 68 need not be reduced. Accordingly, the dimension of the opening 50 perpendicular to direction 68 does not necessarily also need to be below the threshold dimension (e.g. five millimeters) because the weld pool does not move in that direction. This is particularly so when the weld bead being formed is bonded to an adjacent weld bead, in which case the weld pool is also supported by the adjacent, previously formed weld bead. Forming the cladding layer is then a matter of forming plural weld beads that span the opening 50, are oriented transverse to the discrete filaments 52, are bonded to the discrete filaments 52, and are bonded to each other.

Alternately, the laser beam may be adjusted in power and rapidly rastered to span the full blade width thereby maintaining a melt completely across the width. In this case a relatively long melt puddle in the direction of forward progression could require incremental support transverse to the discrete filaments 52.

Figure 6:
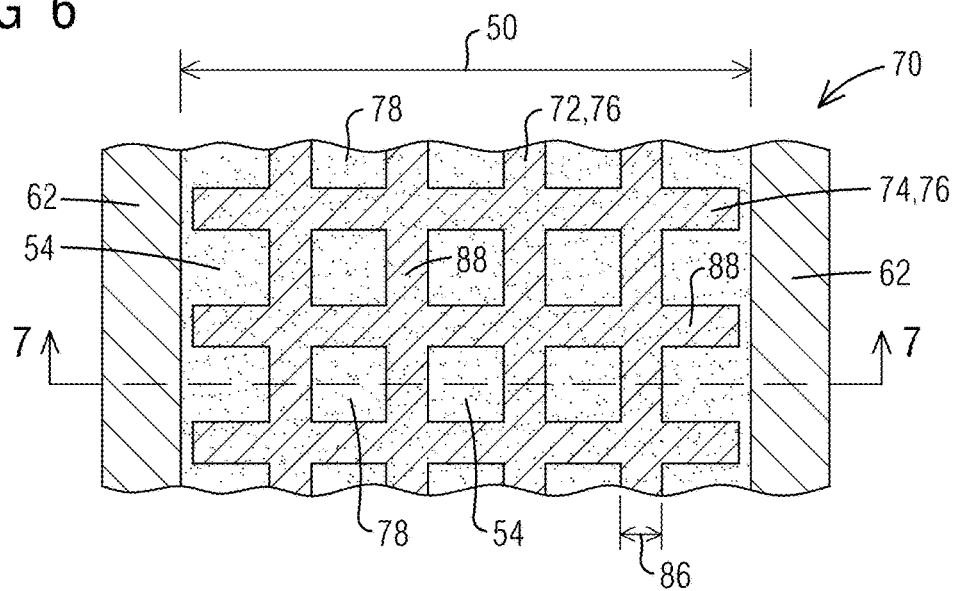
FIG. 6 schematically illustrates a top view of an alternate exemplary embodiment of a cladding support arrangement.
Figure 7:
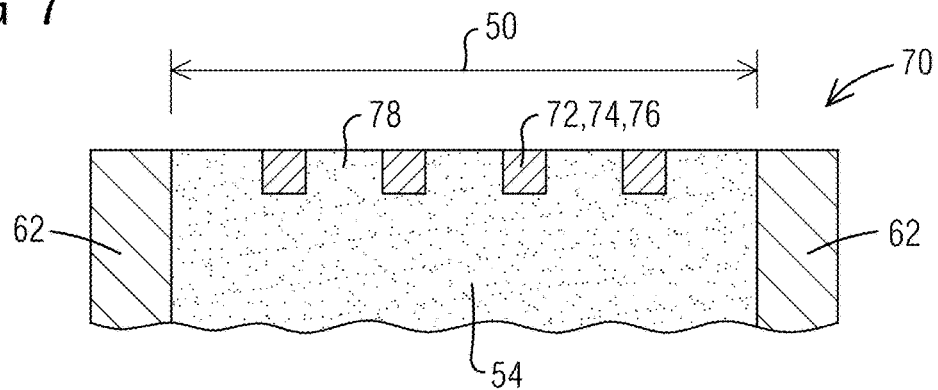
FIG. 7 schematically illustrates a side cross section of the support arrangement of FIG. 6.

More generally, a supporting arrangement 70 including a support structure 72 and supporting powder 54 is employed to make such cladding possible. The support structure 72 may take any number of forms. FIG. 6 shows an alternate exemplary embodiment where, instead of using discrete filaments 52, the support structure 72 includes a grid 74 composed of joined filaments 76 and having grid openings 78. FIG. 7 is a sectional view of the apparatus of FIG. 6 as viewed along section 7-7. An advantage of the grid is that it provides support in every direction, which provides latitude during laser processing. For example, it can be of particular advantage in the aforementioned case of rapidly scanned laser and elongated melt puddle. Another advantage of the grid is that it provides integral support of filaments and fixes definition of their spacing during processing. If the opening 50 corresponds to a mid-span opening 24 of a gas turbine engine blade 10, a width of the opening 50 may be approximately twenty millimeters. If the joined filaments 76 are evenly spaced, (even spacing is not necessary), a width of each of the grid openings 78 may be less than 4 millimeters (when a width 86 of the joined filaments 76 is considered), which is below the threshold dimension, thereby enabling cladding of the opening 50. The powdered metal and the powdered flux can be placed on an upper surface 88 of the grid 74 and on the supporting powder 54 and laser processed to form a single cladding layer that covers the twenty millimeter opening 50 as well as the underlying blade material (e.g. the blade walls 62).

The supporting powder 54 may include a material that does not melt during the laser processing. Example materials include ceramics (e.g. alumina, zirconia, beryllium oxide, sapphire, silica, magnesium oxide, boron nitride, aluminum nitride, silicon nitride, silicon carbide, aluminum silicate and magnesium silicate), compound mixtures such as mullite, or single elements such as carbon (graphite). The supporting powder 54 may include powdered flux that may be the same or similar to that placed on or in the powdered metal that is placed on the support structure 72. Alternately, the supporting powder may include powdered metal or alloy that is the same or similar or complementary to the powdered metal alloy that is placed on the support structure 72 to form the deposit.

The support structure 72 may include a metal or a metal alloy and may have the same composition as the powdered metal alloy used for the deposit. Since the support structure 72 may be only fused proximate its top surface and is generally only partly melted, it does not represent significant alloying of the melt pool. Consequently, the support structure 72 may include lesser metals, for example, pure nickel, Inconel® alloy 625 (Ni 58% min, Cr 20-23%, Mo 8-10%, Nb+Ta 3.15-4.15%, Fe 5% max), Hastelloy® X alloy (Ni 47%, Cr 22%, Fe 18%, Mo 9%, Co 1.5%, W 0.6%, C 0.10%, Mn 1% maximum, Si 1% maximum, B 0.008 as balance), and stainless steel. In one embodiment, the support structure 72 may be formed of a material containing an element that is a constituent part of the deposited powdered alloy material, such as when using a nickel, cobalt, tungsten or aluminum wire support with a superalloy powdered alloy material containing such elements. Some laser deposition processing tends to lose titanium as a result of reaction of the titanium with $CO^2$ or $O^2$ during the deposition process, so in an embodiment, the support structure 72 may include titanium which is then melted into the melt pool to counteract this loss. The support structure 72 (the discrete filaments 52 or the grid 74) may rest atop the supporting powder 54. Alternately, the support structure 72 may be submerged up to the upper surface 60 in the case of the discrete filament 52 or the upper surface 88 in the case of the grid 74. Alternately, the supporting powder 54 may extend to a level anywhere in between. The support structure 72 is partly melted during the laser processing to ensure its mechanical bonding to the deposited layer of material, but at least a part of it may remain unmelted, with the unmelted portion providing structural support for the cladding layer. Unmelted support structure could also leave ribs that function to enhance cooling. In some embodiments, a full depth of the support structure 72 may be melted and incorporated into the melt pool in at least some local areas; however, the unmelted support structure 72 in the region immediately ahead of the melt pool provides the required support to the melt pool in cantilever fashion due to the surface tension effect.

The support structure 72 (the discrete filaments 52 or the grid 74) may touch the underlying blade material (e.g. the blade walls 62) and may be supported from that structure, or it may be spaced apart from the underlying blade material. Any shape of grid may be used, such as those having circular or hexagonal openings, etc. Expanded metal (sheet with circular openings) is relatively inexpensive and available. Screen is also readily fabricated from wire and may be flattened to establish a consistent (planar) support surface. Grid can be readily cut to fit a variety of opening shapes.

Figure 8:
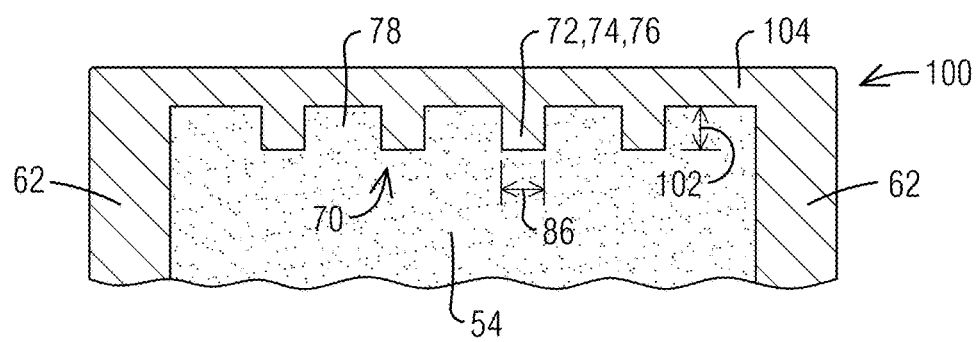
FIG. 8 schematically illustrates a side cross section of a repair created using the method disclosed herein.

FIG. 8 schematically illustrates a side cross section of a repaired blade tip 100 after the deposition of a cladding layer 104 over the structure of FIG. 7. In this exemplary embodiment the filaments 76 included a thickness 102 that remains essentially intact. Example thicknesses include one millimeter and above. In an exemplary embodiment the thickness 102 is 1.2 millimeters. The supporting powder 54 extends into the grid openings 78 in this embodiment approximately the full thickness 102 of the joined filaments 76. The cladding layer 104 has been formed over and has closed the opening 50, and has metallurgically bonded to the grid 74. The supporting powder 54 is then removed, such as by being drained through cooling passage openings formed in the component, to complete the repair to the blade tip 100. The dimension 102 of unmelted grid may be locally adjusted to, for example, enhance structural support or fin cooling at specific locations if required.

Figure 9:
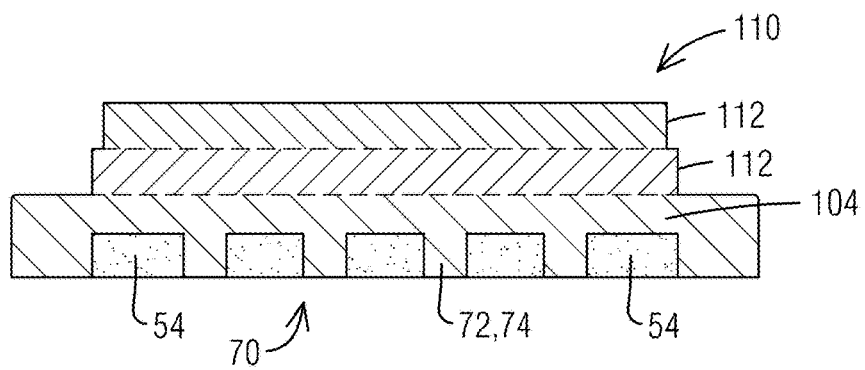
FIG. 9 schematically illustrates a component created using a method disclosed herein.

As can be seen in FIG. 9, instead of cladding over an opening to form a repair, buildups of additively manufactured new product are possible using the method disclosed herein. For example, laser additive manufacturing of a new component 110 no longer must start on a solid end plate that eventually must be machined away. Instead, the process can form the cladding layer 104 on the supporting arrangement 70 and then additional cladding layers 112 can be formed on the cladding layer 104 using any additive manufacturing process desired until the new component 110 is complete. In this manner, the resulting structure 110 is not adhered to a starting end plate. The support structure 72 could become part of the final product or it could be removed.

While many embodiments may utilize a support powder in order to prevent the alloy powder from falling through the openings around the support structure, it is also possible to utilize the support structure without a support powder. This may be accomplished by concurrently delivering the alloy/flux powder and the melting energy beam such that the powder is melted as it is delivered to form a weld pool which is supported from the support structure by surface tension. From one edge of the opening, the energy beam traverses the opening while additional powder is delivered and is melted into the melt pool, thereby extending the reach of the melt pool until it bridges the opening, cooling and solidifying behind the traversing energy beam. Surface tension between the melt pool and the surrounding support structure behind and beside the melt pool is sufficient to support the melt pool as it traverses across the opening. Similarly, a preform such as a sintered powder sheet could be preplaced across a support grid as the supply of filler with no need of support powder.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:
1. A method, comprising:
providing a component including at least two walls separated by a first opening;
spanning the first opening with a support structure configured to divide the first opening into a plurality of second openings wherein the plurality of second openings are smaller than the first;
supporting the support structure with a supporting powder;
melting alloy filler to form a melt pool traversing across the plurality of second openings while in contact with and supported by the support structure;
allowing the melt pool to cool and to solidify to form a cladding layer that covers the first opening and the at least two walls and is metallurgically bonded with the support structure; and
removing the supporting powder after the cooling and solidifying.

2. The method of claim 1, further comprising resting the support structure atop the supporting powder.

3. The method of claim 1, further comprising positioning the support structure in the supporting powder such that the supporting powder extends up beside the support structure.

4. The method of claim 1, wherein the supporting powder comprises one of the group of a) a ceramic that does not melt during the melting step and b) a flux and metal that is partially melted during the melting step.

5. The method of claim 4, wherein the supporting powder comprises a ceramic is selected from a group consisting of alumina, zirconia, beryllium oxide, sapphire, silica, magnesium oxide, boron nitride, aluminum nitride, silicon nitride, silicon carbide, aluminum silicate, mullite, graphite and magnesium silicate.

6. The method of claim 1, wherein the supporting powder comprises flux.

7. The method of claim 1, wherein the supporting powder comprises a metal or metal alloy.

8. The method of claim 1, wherein the support structure comprises a grid.

9. The method of claim 1, wherein only a portion of a thickness of the support structure is melted during the melting step to become metallurgically bonded with the cladding layer.

10. The method of claim 1, wherein the support structure comprises an element that is a constituent part of the alloy filler.

11. The method of claim 1, wherein the first opening is formed in a gas turbine engine blade tip.

12. The method of claim 1, further comprising:
providing a supporting powder under the support structure; and
depositing a layer of metal alloy filler powder over the supporting powder and support structure prior to the melting step.

13. A method, comprising;
providing a component including at least two walls separated by a first opening;
positioning a grid defining a plurality of second openings smaller than the first opening with a supporting powder across the first opening;
depositing a layer of superalloy powder on the grid and on the supporting powder; and
laser heating the superalloy powder to melt the powder and at least part of the grid to form a cladding layer that covers the first opening and the at least two walls and that is metallurgically bonded with the grid,
wherein the grid comprises a metal or a metal alloy.

14. The method of claim 13, wherein the grid rests atop the supporting powder.

15. The method of claim 13, wherein the supporting powder extends upward into the relatively smaller openings defined by the grid.

16. The method of claim 13, wherein the grid comprises a superalloy material.

17. The method of claim 13, wherein the grid comprises an element that is a constituent part of the superalloy powder.

18. The method of claim 13, wherein the first opening is formed in a gas turbine engine blade tip.

19. A method, comprising:
positioning a support structure within a first opening of a gas turbine blade tip to divide the first opening opening into a plurality of second openings, wherein the plurality of second openings are smaller than the first opening;
traversing a melt pool across the plurality of second openings, the melt pool supported by surface tension across the plurality of second openings; and
allowing the melt pool to solidify to form a layer of cladding material covering the first opening.

* * * * *